US009509817B1

(12) United States Patent
Peters

(10) Patent No.: US 9,509,817 B1
(45) Date of Patent: Nov. 29, 2016

(54) COMMUNICATION DEVICE ENCLOSURE

(71) Applicant: **GLOBAL TEL*LINK CORPORATION**, Reston, VA (US)

(72) Inventor: Brian R. Peters, St. Paul, MN (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 14/872,509

(22) Filed: Oct. 1, 2015

(51) Int. Cl.
| H04M 1/00 | (2006.01) |
| H04M 1/11 | (2006.01) |
| H04M 1/02 | (2006.01) |
| H04M 1/247 | (2006.01) |

(52) U.S. Cl.
CPC ............. *H04M 1/11* (2013.01); *H04M 1/0295* (2013.01); *H04M 1/2473* (2013.01)

(58) Field of Classification Search
CPC ... H04M 1/11; H04M 1/0295; H04M 1/2473
See application file for complete search history.

(56) References Cited

U.S. PATENT DOCUMENTS

| 6,606,384 B1* | 8/2003 | Kruse | H04M 1/02 348/E7.079 |
| 2003/0012367 A1* | 1/2003 | Seo | H04M 1/04 379/419 |
| 2005/0069101 A1* | 3/2005 | Bear | H04M 1/2473 379/88.17 |
| 2008/0219240 A1* | 9/2008 | Dylag | H04M 1/2473 370/352 |

* cited by examiner

*Primary Examiner* — Tuan D Nguyen
(74) *Attorney, Agent, or Firm* — Sterne, Kessler, Goldstein & Fox P.L.L.C.

(57) ABSTRACT

An enclosure for communication devices is described comprising a rear housing and a faceplate. Various faceplates may be provided for different communication devices. The rear housing mounts to existing phone backboards. The rear housing may remain mounted and the faceplate exchanged for a different faceplate with a different communication device. The enclosure provides a simple, ubiquitous, an inexpensive enclosure that can support various communication devices that provide a variety of communication services to users such as email, VOIP, video calls, or other advanced telecommunications.

8 Claims, 13 Drawing Sheets

COMMUNICATION DEVICE ENCLOSURE

BACKGROUND

Field

This disclosure relates generally to an enclosure and mounting system for communication devices. In particular, this disclosure relates to a system for mounting communications devices in places previously occupied by conventional telephone systems.

Background

Telephones are mounted to walls by phone backboards. Phone backboards are mounting boards that allow conventional telephone systems ("plain old telephone service" or "POTS") to be mounted to a wall or other mounting point such as a pedestal. Conventional telephone systems conventionally provided only analog voice communication capabilities. These conventional telephone systems also only require a single telephone cord connection because conventional analog telephones derived both power and connectivity from a single cable. In this manner, conventional telephone systems are limited in their communications capabilities.

BRIEF SUMMARY

In an embodiment, the present disclosure provides a simple, ubiquitous, and inexpensive enclosure that can support various communication devices that provide a variety of communication services to users. In an embodiment, a single enclosure is provided that can be adapted to a variety of purposes for different types of services such as email, VOIP, video calls, or other advanced telecommunications. In an embodiment, the enclosure comprises a universal rear housing and a faceplate. The universal rear housing reduces installation and service cost compared to conventional communication system deployment. When one communication device is retired, the rear housing can stay in place and accommodate a new communication device in the same faceplate or in a new faceplate, depending on device dimensions. As a result, equipment cost and installation cost are reduced. The unique, two component design allows for interchangeable faceplates without the need to change the rear housing. Thus, when a communication device becomes obsolete, broken, or otherwise reaches its end of life, the rear housing can remain while only the faceplate is replaced with new hardware. This further reduces hardware obsolescence and cost of replacement.

Embodiments include faceplates for a variety of communication devices of varying dimensions and sizes. For example, in some embodiments the communication device is a tablet computer. Embodiments of the enclosure can accommodate any size tablet computer, such as a 10.1" tablet or an 8" tablet computer. In an embodiment a tablet computer is installable in both portrait and landscape orientation using the same rear housing and faceplate. Faceplates can be orientated during or after installation to accommodate the type of applications that will be made available to users.

The enclosure according to some embodiments provides a compact, space saving way to provide a variety of communication services to a user using a minimum of wall space and infrastructure. In some embodiments, power-over-Ethernet equipment is housed by the rear housing to provide both power and network connectivity to the communication device, removing the need for 120 VAC infrastructure at each installation point. This is important because the conventional telephones that some facilities were designed for did not require any external power because they received power from conventional POTS phone lines. With the migration away from POTS phone systems to internet, VOIP, video conferencing, and other IP-based communication methods, these facilities do not have the infrastructure to support 120 VAC at each phone installation point. To address these situations, in an embodiment, the rear disclosure houses power-over-Ethernet equipment to provide both power and network connectivity to a communication device from a single Ethernet wire. This makes installation of advanced communication devices easier in facilities that lack the infrastructure to support separate power and network connectivity at every installation point.

Advantageously, some embodiments of the enclosure are designed to fit into installation points that were previously occupied by a conventional "POTS" phone system. These phone system were often installed on phone backboards. In some embodiments the rear housing is configured to attach to these existing phone backboards that are present where older phone systems have been removed. This is yet another way in which the enclosure of embodiments of the invention reduces infrastructure and maintenance cost.

In an embodiment, the enclosure is adapted for use in an institutional setting. Institutional settings include penal institutions, military institutions, hospitals, schools, and businesses. In a prison or other correctional facility, for example, the enclosure is made of high strength materials such as steel or aluminum to provide protection for sensitive communication devices such as tablet computers. Tablet computers by themselves are typically constructed of plastics and glass and are therefore susceptible to damage from misuse or abuse. An enclosure made of high strength materials provides protection against such misuse and abuse by at least partially enclosing the communication device. In order to further enhance device security, the faceplate can include an impact resistant transparent cover for protecting the screen portion of the device. Additionally, all ports of the device can be recessed within the faceplate to prevent damage. The user can then interface with the device through a traditional mouse and keyboard or other external interface. Some institutional environments are limited in infrastructure and budget to deploy advanced communications systems. Such institutions desire to provide the most services at the lowest overall cost. The enclosure described herein fills this need because it is a drop-in replacement for conventional phone systems that are often found in such institutions. The enclosure can therefore provide advanced communication services as well as voice services comparable to conventional telephone systems using the same infrastructure as a conventional phone system.

The foregoing and other aspects, features, details, utilities, and advantages will be apparent from reading the following description and claims, and from reviewing the accompanying drawings.

BRIEF DESCRIPTION OF THE DRAWINGS/FIGURES

Figure 4A:
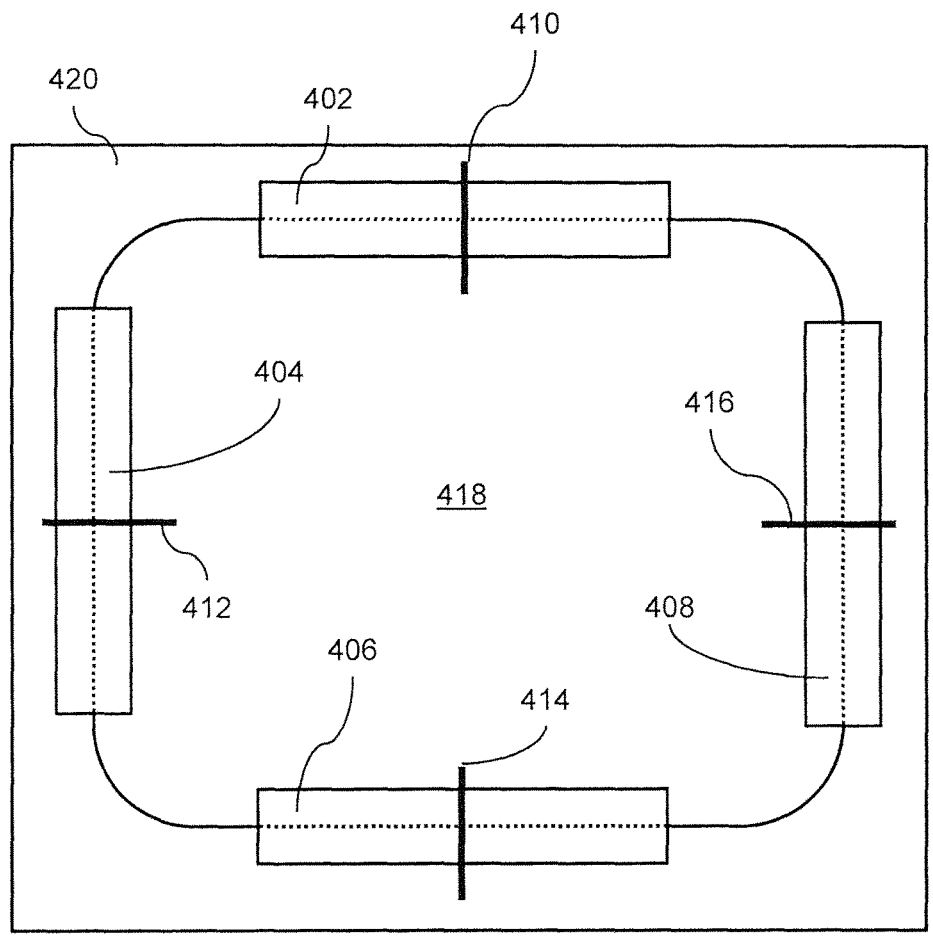
Figure 4B:
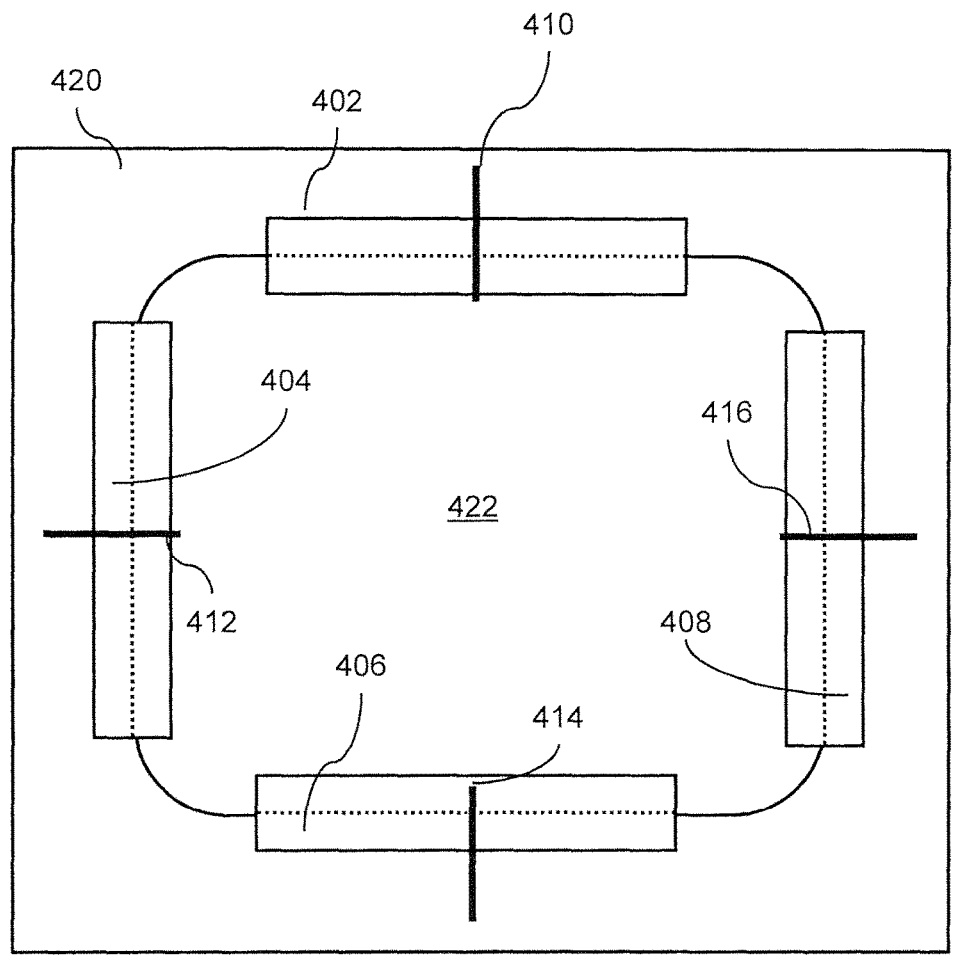

FIGS. 4A-B are perspective views of the inner side of a faceplate according to an embodiment.

DETAILED DESCRIPTION

The following Detailed Description refers to accompanying drawings to illustrate embodiments consistent with the disclosure. References in the Detailed Description to "one embodiment," "an embodiment," "an example embodiment," etc., indicate that the embodiment described may include a particular feature, structure, or characteristic, but every exemplary embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other embodiments whether or not explicitly described.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

The following Detailed Description of the embodiments will so fully reveal the general nature of the disclosure that others can, by applying knowledge of those skilled in relevant art(s), readily modify and/or adapt for various applications such embodiments, without undue experimentation, without departing from the spirit and scope of the disclosure. Therefore, such adaptations and modifications are intended to be within the meaning and plurality of equivalents of the embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communications have evolved significantly since the days of analog telephones. Modern communications involve two-way email, instant messaging exchange, voice over IP ("VOIP") calls, video conferencing, or other such internet protocol ("IP") based communications. Conventional analog telephones cannot deliver these types of services. Therefore it is desirable to be able to provide advanced IP based telecommunications capabilities in the same footprint as conventional analog telephones. It is also desirable to be able to deliver these advanced telecommunication capabilities at a low cost. Embodiments of an enclosure are described herein, which provide a simple, cost-effective, and versatile way to install advanced communications devices within a facility.

FIGS. 1A-H illustrate embodiments of enclosure 100. Enclosure 100 comprises housing 102 and a faceplate 104. Faceplate 104 at least partially encloses a communication device. Faceplate 104 is attached to housing 102 by a faceplate mounting point that is not visible in this view. Housing 102 has an angled front side to present faceplate 104 at an ergonomic angle to the user. Housing 102 has a bracket or brackets for mounting on an existing baseplate.

Faceplate

Faceplate 104 securely partially encloses communication device and includes an opening sized to substantially the same size as the screen of communication device so that the screen is viewable by a user. Faceplate 104 securely retains and encloses communication device so that communication device cannot be removed from the faceplate by a general user. Faceplate 104 is constructed so that a user interface of the communication device is accessible to a user but so that the device itself is not removable from the faceplate 104 by the user. The faceplate 104 therefore prevents theft of the communication device. Faceplate 104 is also designed to protect the communication device from vandalism or other damage by enclosing portions of the communication device. Faceplate 104 is constructed of a durable and rigid material to protect the communication device from vandalism or theft. In some embodiments, faceplate 104 includes a transparent screen protecting material to prevent damage to the communication device if the communication device includes a screen. These various protection features are particularly suited for application in environments where abuse or vandalism is anticipated, such as a prison or jail. Other institutional environments also benefit from robust protection from vandalism and abuse because it decreases maintenance costs associated with damage to the communication device and support electronics.

In some embodiments, the communication device is a tablet computer. For purposes of this discussion, a tablet computer is an all-in-one computing device that incorporates a processor, memory, non-volatile memory, communications interfaces, and a screen within a single enclosure. The screen is often a touch screen for user input. Faceplate 104 in these embodiments is substantially a box shape slightly larger than the tablet computer in every dimension. The tablet computer is clamped or otherwise secured within the faceplate such that the tablet computer screen is substantially flush with the front side of the faceplate. There is an opening 106 on the front side of the faceplate through which the tablet computer screen is viewable. Opening 106 is dimensioned to be substantially the same dimensions as the tablet computer screen. The opening creates a bezel around the tablet computer. Slightly larger or smaller opening dimensions are acceptable as long as the tablet computer is securely fastened within faceplate 104 and the screen is not significantly occluded by faceplate 104.

However, in embodiments when device security is a particular concern, opening 106 is smaller to even further limit user access to the physical device. In some embodiments the opening 106 is of a significantly different dimension as the tablet computer. For example, in an embodiment the opening 106 is circular or round and the tablet computer rectangular. While this would occlude portions of the screen, such occlusion is appropriate for some applications. For example, in an embodiment, the communications device runs software to modify its user interface to the unique shape of the opening 106. Such a configuration provides significant protection to the physical device without impeding the user's visibility of the user interface. Such a configuration also increases the durability and vandalism resistance of the enclosure 100 by enclosing more of the communications device with faceplate 104 that is made out of a more durable material than the communications device. A designer at the time of implementation may make the opening any dimension to suit the needs of the intended application.

Computer screens such as those integral to tablet computers can be described in terms of aspect ratio. Aspect ratio of a screen is the ratio of the horizontal dimension of the screen to the vertical dimension of the screen. Tablet computers typically include screens with one of 4:3 aspect ratio, a 3:2 aspect ratio, a 16:10 aspect ratio, a 5:3 aspect ratio, or a 16:9 aspect ratio. For example, a screen that is 16 inches wide and 9 inches tall would be an example of a screen with a 16:9 aspect ratio. However, faceplate 104 is not limited to these aspect ratios, and the faceplate may be adapted to any other aspect ratio screen that is required.

Faceplate 104 includes an aperture 108 to allow, for example, a camera integral to communication device to be not occluded by the faceplate 104. Other embodiments occlude or cover up user interface devices such as a camera. Some tablet computers contain multiple user interface devices integrated into the tablet computer housing. Examples of user interface devices in tablet computers include cameras, microphones, ports, and buttons. Ports commonly found on tablet computers include but are not limited to microphone ports, universal serial bus ports, headphone ports, or the like. In an embodiment, faceplate 104 is configured to selectively cover, or block one or more of these user interface devices. This protects the devices from tampering by a user. In an alternative embodiment, faceplate 104 is configured to not block or cover these devices so as to allow for easy access and/or functionality. For example, in an embodiment the tablet computer includes a camera and faceplate 104 is dimensioned such that the camera is not blocked, or occluded, by faceplate 104. This allows the camera of the tablet computer to view a user of the tablet computer. This can be useful in certain environments to allow for video conferencing or facial recognition. In other embodiments, certain user interface devices are inaccessible to the user. For example, in some embodiments the camera is covered by the faceplate so that it is substantially unusable. The same selective blocking or occluding can be applied to other user interface devices such as microphones, buttons, ports, or other user interface devices. Each application may require a different assortment of tablet user interface devices to be either accessible or not accessible to the end user.

Figure 3:
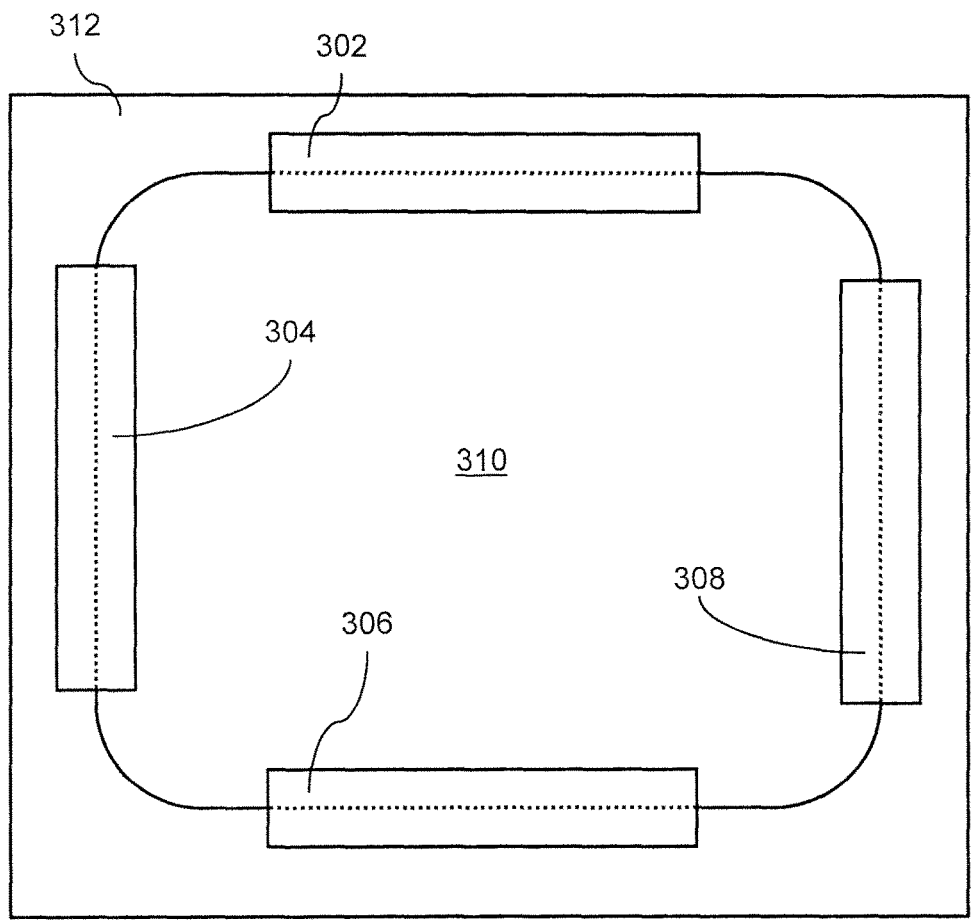
FIG. 3 is a perspective view of an inner side of a faceplate according to an embodiment.

FIG. 3 is an internal view of a faceplate according to an embodiment that illustrates shock absorbing or dampening seats. Communications device 310 is positioned within the faceplate in between seats 302-308 in order to protect the device from drops or other impacts while within faceplate 312. Some embodiments also include a shock absorbing or dampening gasket in between the front of communications device 310 and faceplate 312. The shock absorbing or dampening gasket provides a barrier in between the front of device 310 and faceplate 312. The shock absorbing or dampening gasket may be a single, continuous piece of material or may be made from several smaller seats similar to seats 302-308. These smaller gasket seats reduce impact between the communications device and the front and back of faceplate 104 while seats 302-308 reduce impact with the sides and lateral motion. All shock absorbing or dampening seats and gaskets are made of an appropriate material such as but not limited to foam, rubber, or plastic.

FIG. 4A is an internal view of a faceplate according to an embodiment that illustrates an adjustable seat design. Faceplate 420 accommodates a range of sizes of communication devices with adjustable seats 402-408. In FIG. 4A adjustable seats 402-408 travel along adjustable members 410-416 to accommodate communication device 418. In FIG. 4B the same adjustable seats 402-408 are adjusted to accommodate a smaller communication device 422. Other embodiments have fewer or more adjustable seats. For example, some embodiments have just two adjustable seats on opposite sides, or a single adjustable seat with a stationary non-adjustable seat on the opposite side. Other embodiments may also have adjustable seats located at the corners of communication device 418 rather than the edges as illustrated in FIG. 4.

Faceplate Mount

Figure 1A:
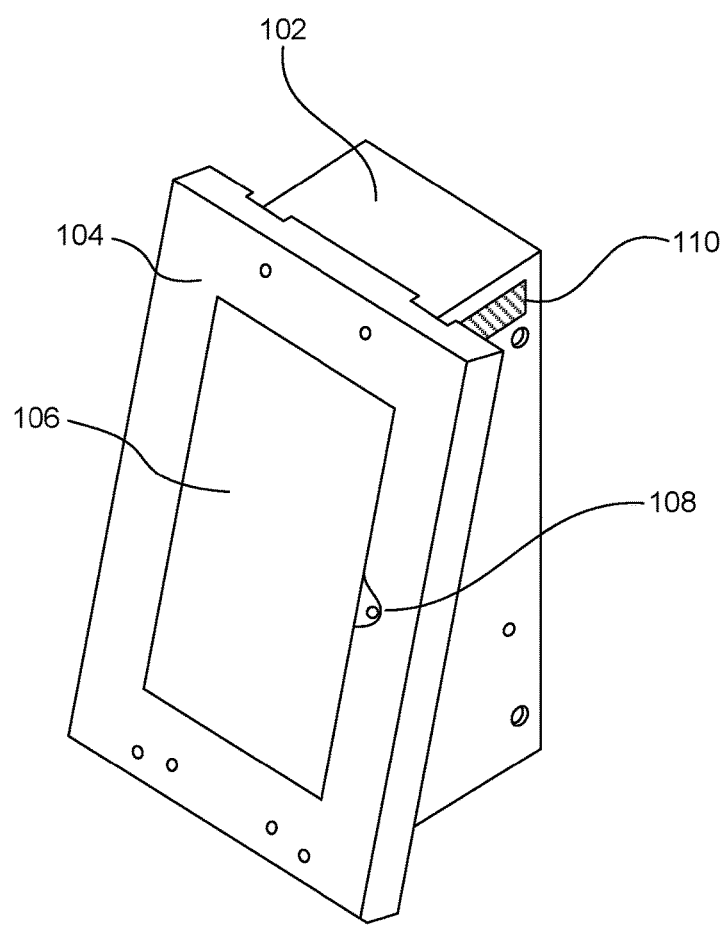
FIG. 1A is a perspective view of an enclosure according to an embodiment.
Figure 1B:
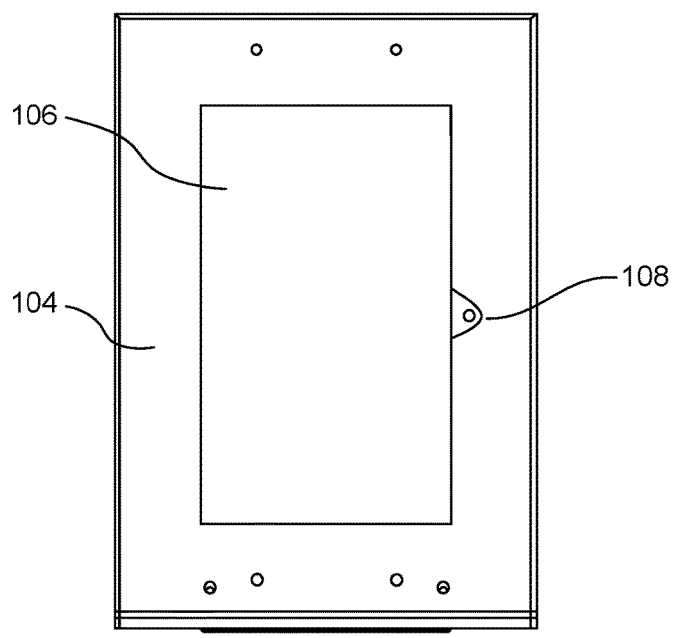
FIG. 1B is a front view of an enclosure according to an embodiment.
Figure 1C:
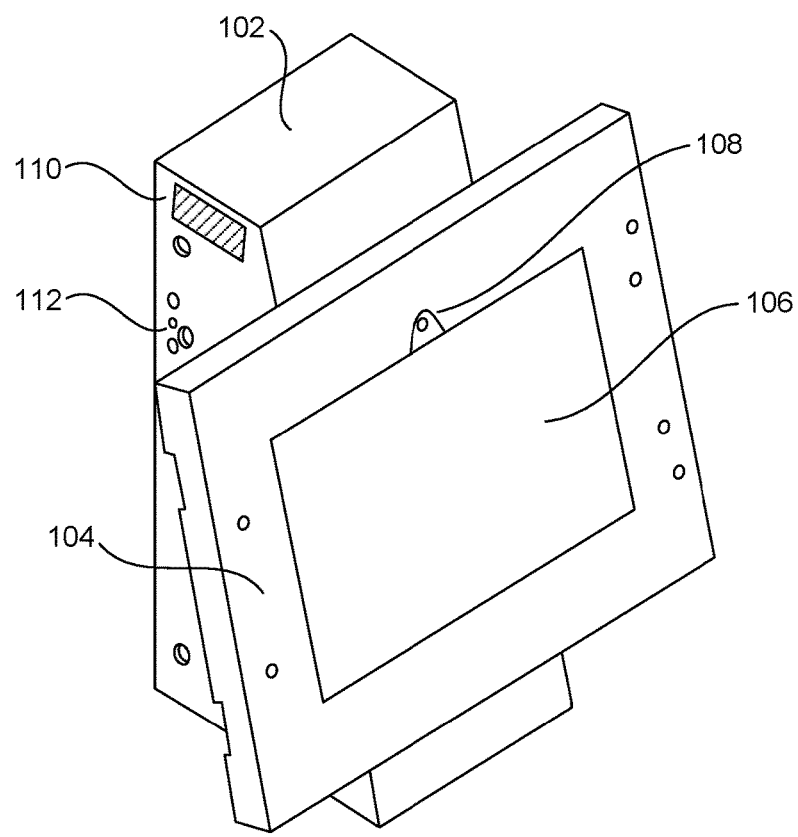
FIG. 1C is a perspective view of an enclosure according to an embodiment.
Figure 1D:
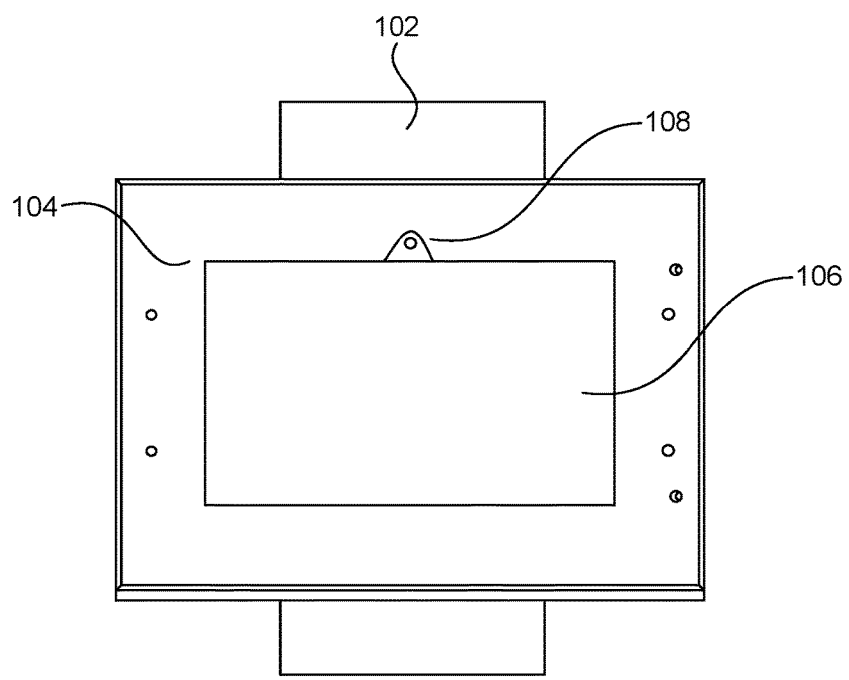
FIG. 1D is a front view of an enclosure according to an embodiment.

Returning to FIG. 1A-H, faceplate 104 mounts to a front mount side of housing 102. The mount side of the housing includes a faceplate mounting point for physically securing the faceplate to the housing. FIG. 1C for example illustrates how faceplate 104 is mounted to housing 102. The faceplate mounting point may be any type of mounting apparatus that physically joins the faceplate to the housing. In an embodiment, the faceplate mounting point is a bolt hole pattern that allows the faceplate to be bolted to the housing. The faceplate mounting point is configured to be non-directional. In other words, the faceplate mounting point allows the faceplate to be mounted in at least a vertical orientation or a horizontal orientation.

In embodiments where the faceplate is rectangular or has one dimension greater than the other, the faceplate is mounted in either a landscape or portrait orientation. Landscape orientation is any orientation where the horizontal dimension is greater than the vertical dimension. Portrait orientation is any orientation where the vertical dimension is greater than the horizontal dimension. For example, FIG. 1A illustrates a faceplate mounted in a portrait orientation and FIG. 1C illustrates a faceplate mounted in a landscape orientation. In an embodiment, the faceplate mounting point can be configured to permit installation in at least a portrait or landscape orientation, and to retain that orientation while the faceplate is mounted.

In an embodiment, the faceplate mounting point includes a rotatable member to allow faceplate 104 to be rotated with respect to housing 102. In this embodiment, the rotatable mounting point is configured to allow an end-user to rotate it on demand. In another embodiment the rotatable mounting point is configured to be rotatable only during installation or maintenance. This would allow for a communication device enclosed in the faceplate 104 to be changed from one orientation to another, for example from portrait to landscape orientation.

The faceplate mounting point includes a passage for wires or other communications between electronics in the housing and the communication device. For example, in an embodiment, the housing houses a power supply unit to supply power to the communication device. In this embodiment, the power supply cable passes through the faceplate mounting point to the faceplate and connect to the communication device. Other examples of support electronics that may be housed by the housing include network communications cables or user interface peripheral cables, such as a keyboard cable or a USB cable for other communications. The passage may be dimensioned to accommodate any wires or communications necessary between housing 102 and faceplate 104.

Housing

Housing 102 has an angled front mount side to present faceplate 104 at an ergonomic angle to the user. For example FIGS. 1G and 1H illustrate one example of an ergonomic angled front mount side. This is advantageous in installations where the housing is mounted at a height lower than the expected eye level of a user. The angle is chosen to allow a user to view the communication device with minimal discomfort. For example, in some embodiments, the housing is installed in on a former POTS telephone mount. These mounts were generally positioned to be only about four to five feet off the ground to allow for the telephone keypad to approximately align with a user's arms. Thus, in an embodiment, the enclosure described herein will often be positioned lower than eye level. The angled screen is configured to compensate for the vertical positioning. In other embodiments, housing 102 has a non-angled front mount side.

Housing 102 includes air vents 110 to allow ventilation of any internal components housed by housing 102. In an embodiment, the air vents 110 are positioned toward an uppermost portion of the side walls of the housing 102. Due to the rising properties of heat, positioning the air vents at the top of the housing will allow for better heat dissipation. Additionally, it is sometimes preferred to divert heat away from a top surface, since user's are often inclined to rest objects or place their hands on the top of the housing out of convenience. This can cause property damage, result in injury, or constitute a fire hazard. Therefore, in an embodiment, the air vents 110 are not placed on the top surface, but rather on the side surfaces of the housing 102. Air vents 110 prevent accumulation of excess heat from internal components. In an embodiment, in order to further improve airflow within the housing and further prevent overheating, a fan or other air dispersal device can be positioned at or near the air vents. In other embodiments air vents are placed so as to be substantially inaccessible to users to prevent vandalism or accidental ingress into the housing 102 to protect any support electronics housed within housing 102.

Figure 1E:
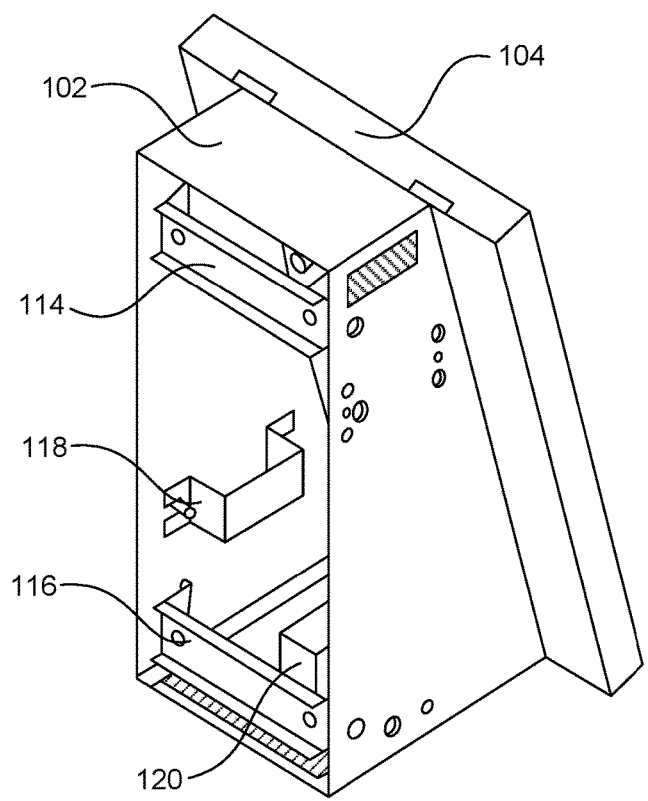
FIG. 1E is a rear perspective view of an enclosure according to an embodiment.
Figure 1F:
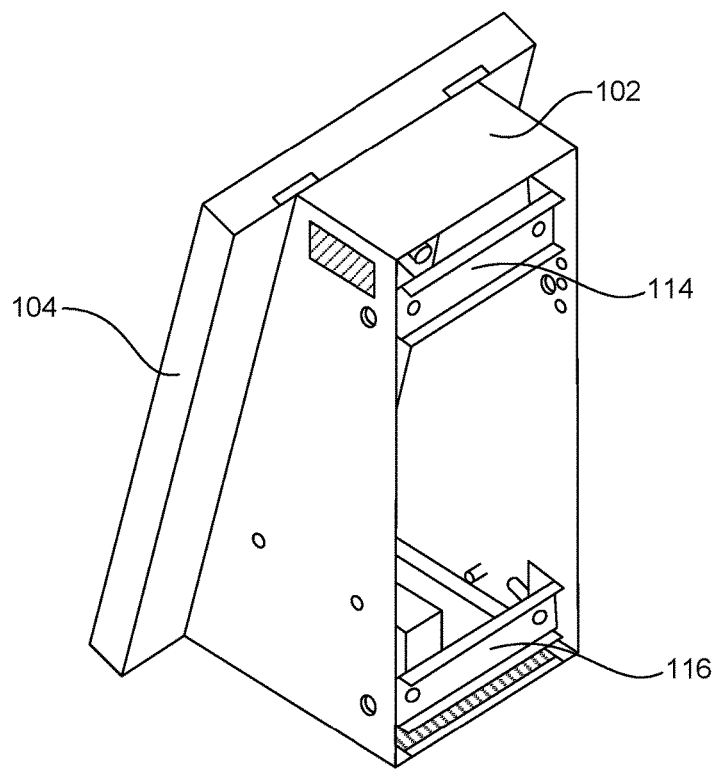
FIG. 1F is a rear perspective view of an enclosure according to an embodiment.
Figure 1G:
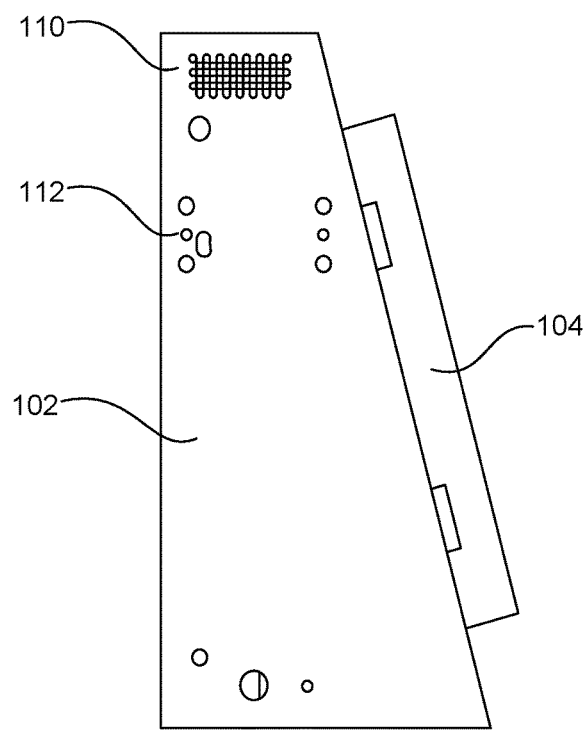
FIG. 1G is a side view of an enclosure according to an embodiment.
Figure 1H:
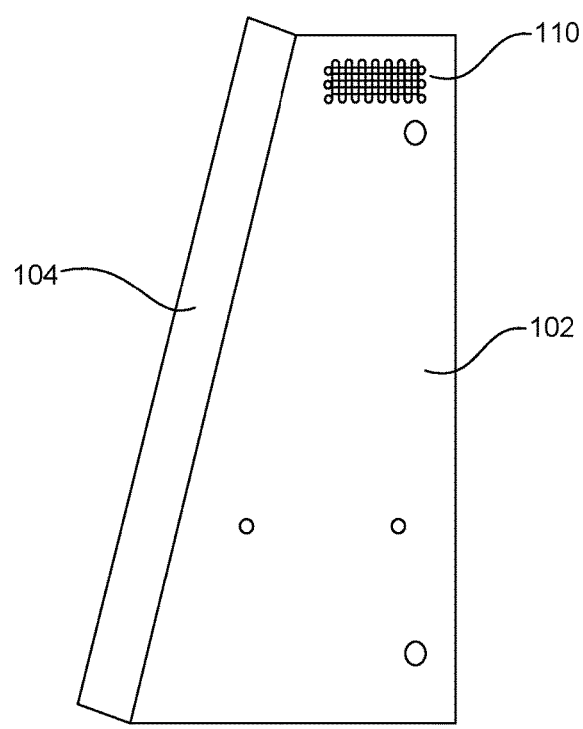
FIG. 1H is a side view of an enclosure according to an embodiment.

FIGS. 1E-F are rear perspective views of enclosure 100 according to an embodiment. Housing 102 includes internal brackets 118 and 120 for securely fastening any support equipment. Examples of support equipment that may be enclosed by housing 102 include power conversion equipment and network interface equipment. Any other kind of equipment to facilitate communications may also be enclosed in housing 102. In some embodiments housing 102 includes any number of internal brackets or mounting points for various equipment as necessary.

Housing 102 also includes phone backboard mounting points 114 and 116. Phone backboard mounting points 114 and 116 are configured such that they allow mounting on any phone backboard. The housing includes a back side that is adapted to mount to an existing phone backboard. For example, in some embodiments, the rear housing is mountable to commercially available phone backboards such as the TMG TM4500, TMG TM4000, the TMG TM178A-ADP-300, or other phone backboards. This allows the enclosure to be mounted where conventional phone systems have previously been installed. To facilitate mounting to existing backboards, the housing back side includes a mounting plate or brackets on the rear surface with attachment points in a pattern compatible with phone backboards.

Housing 102 also includes optional mounting point 112 for mounting additional hardware. Optional mounting point 112 is discussed in more detail below.

Handset

Figure 2A:
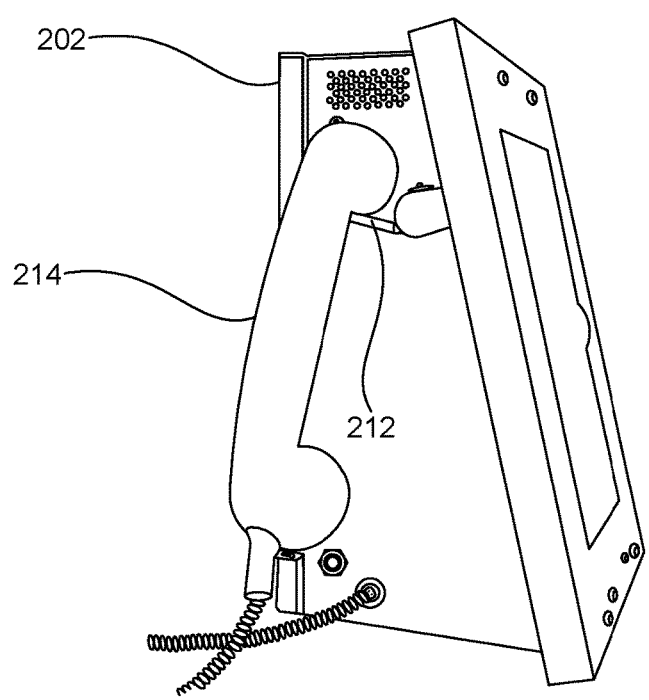
FIG. 2A is a view of an enclosure according to an embodiment that shows optional hardware mounted to the enclosure.
Figure 2B:
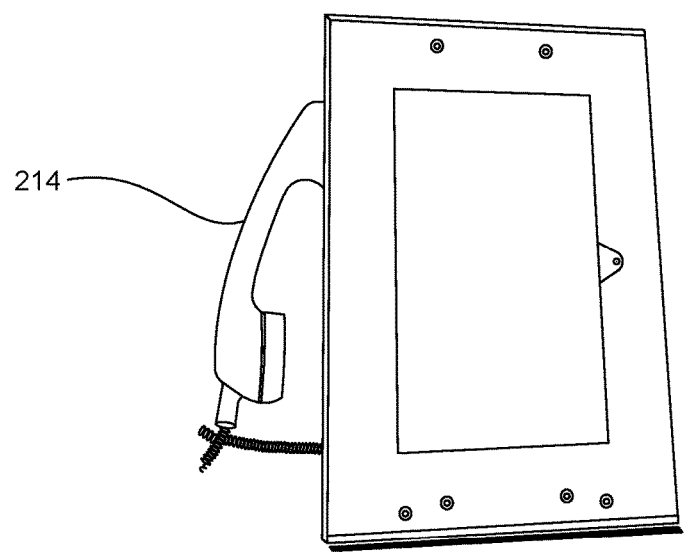
FIG. 2B is a view of an enclosure according to an embodiment that shows optional hardware mounted to the enclosure.

FIG. 2A is a perspective view of an enclosure 200 according to an embodiment that shows optional hardware mounted to the enclosure by the mounting point 112. Handset hook switch 212 is mounted to the mounting point 112 on housing 202. Handset 314 rests on handset hook 212. FIG. 2B is a front view of enclosure 200 according to an embodiment that shows optional hardware mounted to the enclosure. Handset 214 rests on a handset hook that is mounted to enclosure 202.

A hook switch is a hook that holds a telephone handset and indicates when the handset is on the hook and when it is not on the hook. Including a handset into the enclosure 100 is beneficial when replacing conventional POTS phone systems because it allows a single enclosure to provide voice services comparable to conventional POTS phone systems as well as advanced IP-based services. This provides a cost-effective upgrade path for conventional POTS phone system installations. Housing 202 may also house support equipment that enables the communication device to receive both power and network communications via a single connection comparable to conventional POTS phone systems.

As discussed above, including a handset and hook switch on enclosure 200 enables the enclosure to provide both voice communications comparable to conventional POTS phone systems as well as IP-based communications in a single enclosure. Also as discussed above, the enclosure is mountable on phone backboards that conventional POTS phone systems are mounted to. Thus, it is possible to install a system including enclosure 200 in locations previously occupied by conventional POTS phone systems that provides voice services comparable to conventional POTS systems as well as IP-based communications services.

In an embodiment, the communication device is configured with software to utilize the handset 314. In an embodiment, the software is configured to put the communication device into a voice communication mode when handset 314 is lifted off of handset hook switch 212. For example, the voice communication mode presents a user interface comparable to a conventional POTS phone system including a number pad. In this way the enclosure and communication device provide voice services comparable to conventional POTS phone systems. This embodiment also demonstrates how the enclosure can provide voice services to users in a manner that is familiar to users of conventional POTS phone systems by emulating a conventional POTS phone. In another embodiment the faceplate includes a physical number pad for user interaction similar to conventional POTS phone systems. A physical number pad can provide DTMF or other control signals to the communication device to inform the communication device of a telephone number desired to be called. In combination with handset 314, the physical number pad provides a familiar interface to users accustomed to conventional POTS phone systems.

Although several embodiments of this invention have been described above with a certain degree of particularity, those skilled in the art could make numerous alterations to the disclosed embodiments without departing from the spirit or scope of this invention. Therefore, it is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A communication device enclosure, comprising:
   a housing that encloses one or more processors and/or circuits;
   a faceplate attached to the housing, the faceplate configured to partially enclose a communication device;
   a handset disposed outside the housing and electrically connected to the one or more processors and/or circuits; and
   a handset hook switch attached to an outer surface of the housing and electrically connected to the one or more processors and/or circuits, the handset hook switch configured to physically support the handset when the handset is not in use and to electrically communicate whether the handset is in use or not in use to the one or more processors and/or circuits;
   wherein the communication device enters a communication mode in response to the handset being lifted off of the handset hook switch.

2. The apparatus of claim 1, wherein the communication device includes a touch-screen display.

3. The apparatus of claim 2, wherein the communication device enters a voice communication mode in response to the handset being lifted off of the handset hook switch, and
   wherein the touch-screen display displays a graphical user interface that portrays a number pad when the communication device enters the voice communication mode.

4. The apparatus of claim 2, wherein the communication device enters a video communication mode in response to the handset being lifted off of the handset hook switch.

5. A communication device enclosure, comprising:
   a housing having a front side and a back side, the housing back side being adapted to mount to a phone backboard, the housing front side having a faceplate mounting point;
   a faceplate defining an enclosure that is adapted to partially enclose and support therein a communication device, the faceplate having a front side and a back side, the faceplate back side configured to mount to the faceplate mounting point, and the faceplate front side configured to positionally support a front face of the communication device;
   a handset hook switch attached to an outer surface of the housing; and
   a handset disposed outside the housing configured to rest on the handset hook switch, the handset including a speaker and a microphone;
   wherein the handset is electrically connected to the communication device and the handset hook switch is electrically connected to the communication device.

6. The apparatus of claim 5, wherein the communication device includes an audio input and an audio output, and
   wherein in response to the handset being lifted off of the handset hook switch, the communication device enters a communication mode in which the microphone provides input audio data to the audio input of the communication device and the speaker receives output audio data from the audio output of the communication device.

7. The apparatus of claim 5, wherein the communication device is a tablet computer.

8. The apparatus of claim 5, wherein the faceplate mounting point is configured to mount the faceplate to the housing in both a landscape and a portrait orientation.

* * * * *

UNITED STATES PATENT AND TRADEMARK OFFICE
CERTIFICATE OF CORRECTION

| | | |
|---|---|---|
| PATENT NO. | : 9,509,817 B1 | |
| APPLICATION NO. | : 14/872509 | |
| DATED | : November 29, 2016 | |
| INVENTOR(S) | : Brian R. Peters | |

It is certified that error appears in the above-identified patent and that said Letters Patent is hereby corrected as shown below:

On the Title Page

Item (57) Abstract, Lines 7-8, please replace "ubiquitous, an inexpensive" with --ubiquitous, and inexpensive--.

Signed and Sealed this
Twenty-fifth Day of April, 2017

Michelle K. Lee
*Director of the United States Patent and Trademark Office*